No. 613,420. Patented Nov. 1, 1898.
K. KNUDSEN.
ELECTRIC VEHICLE.
(Application filed June 18, 1897. Renewed Sept. 21, 1898.)
(No Model.) 3 Sheets—Sheet 1.
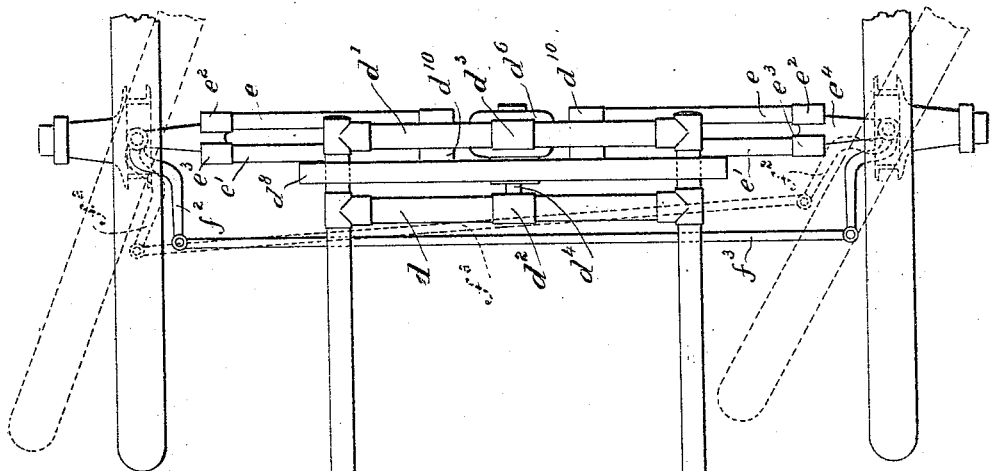
Fig. 1.
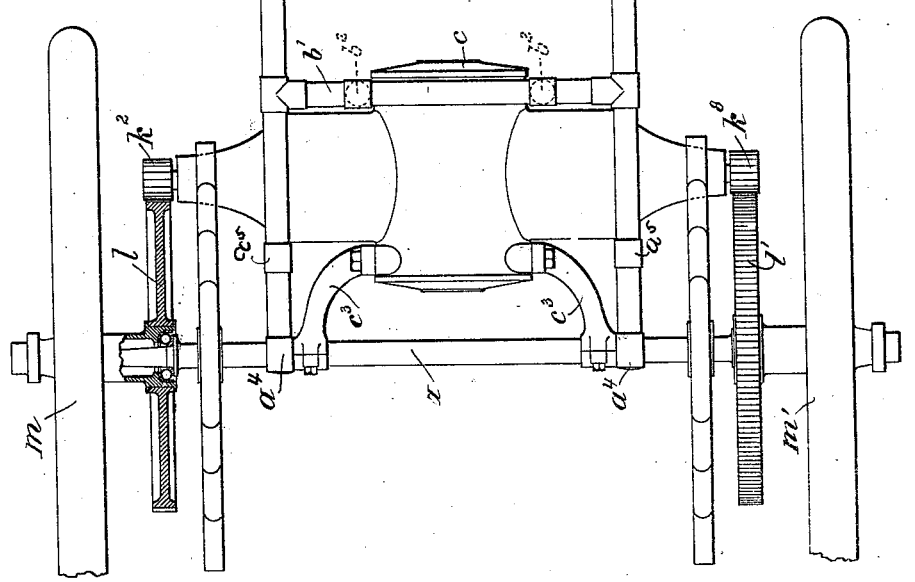
WITNESSES: INVENTOR
Karsten Knudsen
BY Ludington & Jones
ATTORNEYS

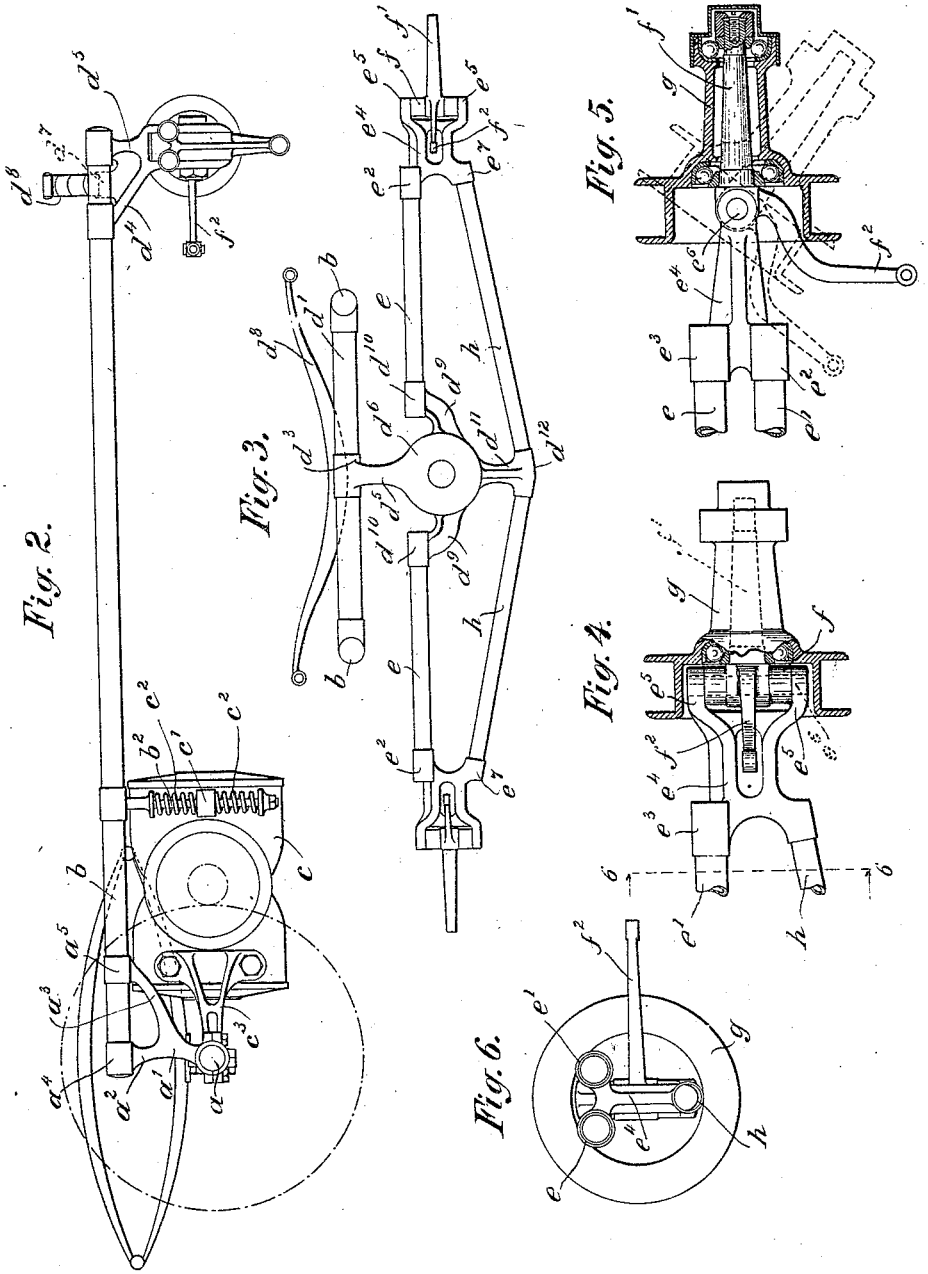

No. 613,420. Patented Nov. 1, 1898.
K. KNUDSEN.
ELECTRIC VEHICLE.
(Application filed June 18, 1897. Renewed Sept. 21, 1898.)
(No Model.) 3 Sheets—Sheet 3.
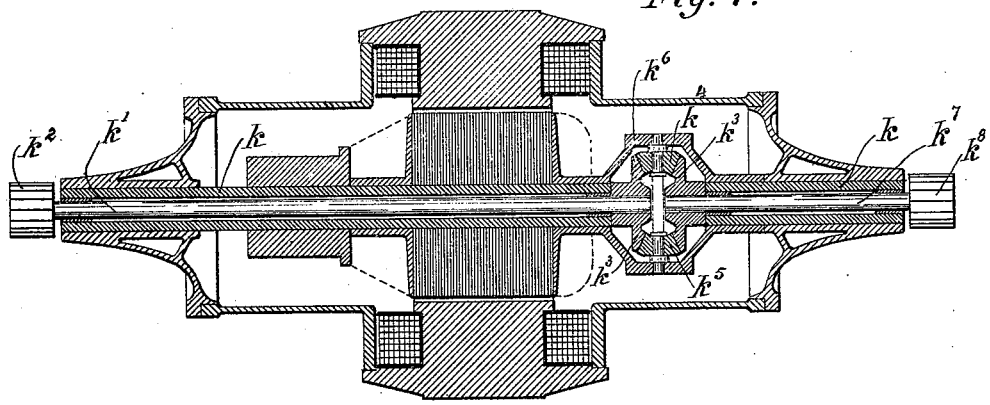
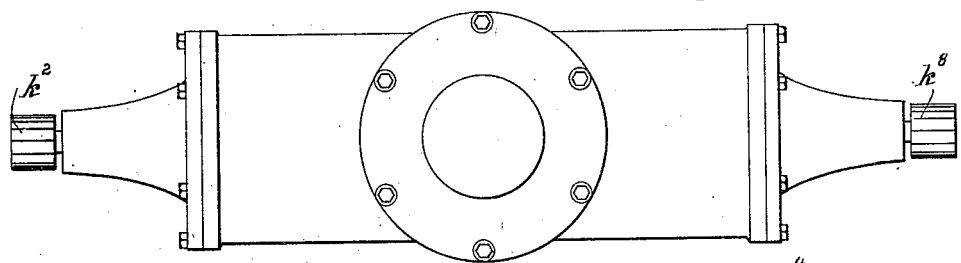
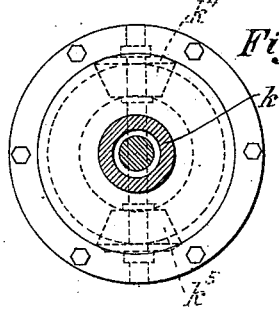
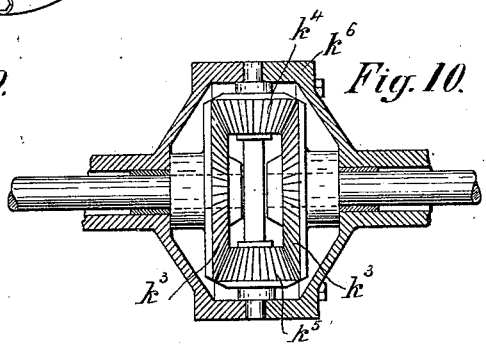
WITNESSES:
INVENTOR
Karsten Knudsen
BY Ludington Jones
ATTORNEYS

UNITED STATES PATENT OFFICE.

KARSTEN KNUDSEN, OF CHICAGO, ILLINOIS, ASSIGNOR TO THE AMERICAN ELECTRIC VEHICLE COMPANY, OF SAME PLACE.

ELECTRIC VEHICLE.

SPECIFICATION forming part of Letters Patent No. 613,420, dated November 1, 1898.

Application filed June 18, 1897. Renewed September 21, 1898. Serial No. 691,539. (No model.)

*To all whom it may concern:*

Be it known that I, KARSTEN KNUDSEN, a citizen of the United States, residing at Chicago, in the county of Cook and State of Illinois, have invented a certain new and useful Improvement in Electric Vehicles, of which the following is a full, clear, concise, and exact description, reference being had to the accompanying drawings, forming a part of this specification.

My invention relates to an electric vehicle, my object being to provide a novel driving-gear between the motor and the positively-driven or propelling wheels of the vehicle.

I have illustrated my invention in the accompanying drawings, in which—

Figure 1 is a plan view illustrating the vehicle of my invention. Fig. 2 is a view in elevation thereof. Fig. 3 is a front view of the frame. Fig. 4 is a detail view illustrating the mounting of one of the guiding-wheels. Fig. 5 is a similar view as seen from above. Fig. 6 is a cross-sectional view on line 6 6, Fig. 4. Fig. 7 is a view in section of the motor and transmitting-gear. Fig. 8 is a view of the motor in elevation. Fig. 9 is an end view of the differential driving-gear. Fig. 10 is a sectional view thereof.

Like letters refer to like parts in the several figures.

Upon the rear axle $a$ are mounted brackets $a'$ $a'$, having upwardly-extending arms $a^2$ $a^3$, carrying sleeves $a^4$ $a^5$ upon the ends, through which pass the longitudinal rods or tubes $b$ $b$. The tubes $b$ $b$ are joined by a transverse tube $b'$, from which are supported vertical rods $b^2$, one on each side of the motor $c$, each rod passing through a lug $c'$ on the side of the motor-frame. Coiled springs $c^2$ $c^2$ rest between said lug and shoulders provided upon the rod $b^2$. To the opposite end of the motor-frame are secured brackets $c^3$ $c^3$, journaled upon the rear axle $a$.

The tubes $b$ $b$ are joined at the forward ends by a pair of transverse tubes $d$ $d'$, which pass through the sleeves $d^2$ $d^3$, carried upon the upper ends of arms $d^4$ $d^5$, provided on a center piece or bracket $d^6$. Between the arms $d^4$ $d^5$ is a web carrying a seat $d^7$ for the spring $d^8$. The center piece $d^6$ is bifurcated, and between the members thereof is a center piece $d^{11}$, pivoted upon journal-pin $d^{12}$. Upon the sides of the center piece $d^{11}$ are mounted brackets $d^9$ $d^9$, each carrying two sleeves $d^{10}$ $d^{10}$, placed side by side, within which are secured the ends of the tubes $e$ $e'$, the opposite ends of which are secured in sleeves $e^2$ $e^3$, carried upon the brackets $e^4$, having bifurcated ends, between the members $e^5$ $e^5$ of which are journaled the transverse portions $f$ of the axles $f'$, upon which the front wheels are journaled.

As illustrated more clearly in Figs. 4 and 5, the hub $g$ of the wheel is provided with a projecting barrel journaled upon ball-bearings upon the axle $f'$, while the journal rests within a hollow space in the hub, the journal-pin $e^6$ occupying a vertical position in the plane of the wheel and directly above the tread of the wheel. An operating-arm $f^2$ is secured to the transverse portion $f$, whereby the axle may be rocked upon its pivot to change the position of the wheel in guiding the same. As shown in Fig. 1, the arms $f^2$ are joined by a transverse rod $f^3$, which may be connected with the guiding-lever in any usual manner. Upon the lower end of the central bracket $d^6$ is provided an arm $d^{11}$, carrying a sleeve $d^{12}$, in which fit the ends of the bracing-tubes $h$ $h$, the opposite ends of which fit in sleeves $e^7$ $e^7$, carried on the bracket $e^4$.

The armature of the motor is mounted upon a hollow shaft $k$, within which is journaled a shaft $k'$, carrying at one end a pinion $k^2$ and at the opposite end a bevel-gear $k^3$, meshing with pinions $k^4$ $k^5$, journaled upon the interior of a box or casing $k^6$, mounted upon the hollow shaft $k$. The pinions $k^4$ $k^5$ mesh with the bevel-gear $k^3$, mounted upon the shaft $k^7$, which forms a continuation of shaft $k'$. Upon the end of shaft $k^7$ is carried a pinion $k^8$. As shown in Fig. 1, the pinions $k^2$ $k^8$ mesh with gear-wheels $l$ $l'$, mounted, respectively, upon the hubs of the wheels $m$ $m'$, the hubs of these wheels being journaled upon the rear axle by ball-bearings. As the armature of the motor rotates the hollow shaft $k$ is rotated, carrying with it the casing $k^6$, upon which the pinions $k^4$ $k^5$ are journaled. When the vehicle is traveling in a straight line, the pinions $k^4$ $k^5$ do not rotate about their own axes, and their bodily movements produce a rotation of the shafts $k'$ $k^7$, due to the interlocking of the pinions with the bevel-gears, and thus transmitting motion to the rear or driving wheels. In turning a curve, where one of the wheels must travel faster than the other, the pinions, while serving to rotate the shafts $k\ k'$, are rotated upon their own axes sufficiently to accommodate the difference in the speed of rotation of the shafts $k'\ k^7$, respectively.

I reserve the feature of pivotal mounting for the guiding-wheels for a divisional application.

Having described my invention, what I claim as new, and desire to secure by Letters Patent, is—

1. In an electric vehicle the combination with an electric motor, of a hollow shaft upon which the rotating element thereof is mounted, a pair of shafts journaled within said hollow shaft and geared respectively with the opposite wheels of the vehicle, bevel-gears mounted on the opposed ends of said shafts, a pair of pinions engaging therewith and mounted on the frame or casing secured to and rotating with said hollow shaft, substantially as described.

2. In an electric vehicle, the combination with an electric motor of a hollow shaft on which the rotating element thereof is mounted, a pair of shafts journaled therein, a pinion mounted upon the outer end of each of said shafts, a pair of vehicle-wheels each carrying a gear-wheel meshing with one of said pinions, a pair of bevel-gears mounted upon the opposed ends of said shafts, a pair of pinions engaging therewith and mounted on the frame or casing, secured to and rotating with said hollow shaft, substantially as described.

3. A vehicle-frame comprising a rear axle, upwardly-extending brackets mounted thereon, a pair of longitudinal tubes secured in said brackets, a cross-piece, an electric-motor frame journaled to the rear axle and resiliently suspended from said cross-piece, a cross-piece joining said longitudinal tubes at the forward end of the frame, a center bracket upon which said cross-piece is supported, tubes extending laterally from said center piece each carrying brackets upon the ends, and a pair of axles mounted upon said brackets to rotate about vertical axes, substantially as described.

In witness whereof I have hereunto subscribed my name in the presence of two witnesses.

KARSTEN KNUDSEN.

Witnesses:
C. E. CORRIGAN,
W. CLYDE JONES.